(12) United States Patent  (10) Patent No.: US 8,909,944 B2
Matsushiba et al.  (45) Date of Patent: Dec. 9, 2014

(54) STORAGE DEVICE

(71) Applicant: International Business Machines Corporation, Armonk, NY (US)

(72) Inventors: Takuji Matsushiba, Kanagawa (JP); Masao Takayama, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 15 days.

(21) Appl. No.: 13/680,445

(22) Filed: Nov. 19, 2012

(65) Prior Publication Data

US 2013/0132739 A1 May 23, 2013

(30) Foreign Application Priority Data

Nov. 19, 2011 (JP) .................................. 2011253368

(51) Int. Cl.
G06F 12/14 (2006.01)
H04N 7/16 (2011.01)
G06F 21/78 (2013.01)
G06F 21/35 (2013.01)

(52) U.S. Cl.
CPC ............ *G06F 12/1408* (2013.01); *G06F 21/78* (2013.01); *G06F 21/35* (2013.01); *G06F 2221/2107* (2013.01)
USPC .......................................... 713/193; 726/26

(58) Field of Classification Search
CPC . G06F 21/10; G06F 2221/2107; G06F 21/34; G06F 21/31; G06F 21/35; G06F 21/1408; G06F 21/78; G06F 21/2107; G11B 20/00086; G11B 20/0021; H04L 9/08; H04L 63/0853; G07F 7/1008; G06Q 20/341

USPC ..................... 713/3, 193, 168, 185; 726/9, 26
See application file for complete search history.

(56) References Cited

U.S. PATENT DOCUMENTS 5,742,756 A * 4/1998 Dillaway et al. ................. 726/20
6,470,082 B1 * 10/2002 Nunokawa et al. ...... 379/357.01
6,653,747 B1 * 11/2003 Proefke et al. ............... 307/10.6
7,694,876 B2 * 4/2010 Barnes et al. ................. 235/377

(Continued)

FOREIGN PATENT DOCUMENTS

CN 1838138 A 9/2006
EP 1705597 A2 9/2006

(Continued)

OTHER PUBLICATIONS

PCT Application No. JP2012072303 Filed: Sep. 3, 2012 PCT/ISA/220/ISA1237 ISA/WO.

*Primary Examiner* — Abu Sholeman
(74) *Attorney, Agent, or Firm* — Joseph A. Abate; Keivan Razavi

(57) ABSTRACT

A storage device started when connected to a computer so as to be able to communicate. The storage device includes: an interface for controlling communication with the computer, a data storage unit for storing data received from the computer via the interface, a radio signal processing unit for receiving radio signals including ID information at a predetermined timing and for authenticating the received ID information, and a control unit for encrypting data using the authenticated ID information as a key, for sending the encrypted data to a data storage unit, and for disabling communication with the computer via the interface when radio signals including the authenticated ID information are not received by the radio signal processing unit within a predetermined period of time.

8 Claims, 3 Drawing Sheets

(56) References Cited

U.S. PATENT DOCUMENTS

| | | | |
|---|---|---|---|
| 2005/0110615 A1* | 5/2005 | Deguchi et al. | 340/10.51 |
| 2006/0226950 A1 | 10/2006 | Kanou et al. | |
| 2008/0268906 A1* | 10/2008 | Ohmoto | 455/558 |
| 2009/0023474 A1* | 1/2009 | Luo et al. | 455/557 |
| 2010/0145819 A1* | 6/2010 | Park | 705/26 |
| 2010/0304794 A1* | 12/2010 | Beninghaus et al. | 455/574 |
| 2010/0327054 A1* | 12/2010 | Hammad | 235/375 |
| 2011/0020026 A1* | 1/2011 | Yoshihara | 399/80 |
| 2011/0047371 A1* | 2/2011 | Timby | 713/153 |
| 2012/0018506 A1* | 1/2012 | Hammad et al. | 235/375 |
| 2013/0233931 A1* | 9/2013 | Narendra et al. | 235/492 |
| 2013/0251150 A1* | 9/2013 | Chassagne | 380/270 |
| 2013/0322622 A1* | 12/2013 | Bailey et al. | 380/44 |
| 2014/0194070 A1* | 7/2014 | DeLuca et al. | 455/68 |

FOREIGN PATENT DOCUMENTS

| | | |
|---|---|---|
| JP | 2005267533 A | 9/2005 |
| JP | 2006268682 A | 10/2006 |
| JP | 2007249263 A | 9/2007 |
| JP | 2009042927 A | 2/2009 |

* cited by examiner

STORAGE DEVICE

CROSS-REFERENCE TO RELATED APPLICATIONS

This application claims priority under U.S.C. 119 from Japanese Patent Application No. 2011-253368 filed on Nov. 19, 2011, the entire contents of which are incorporated herein by reference.

BACKGROUND OF THE INVENTION

1. Field of the Invention

The present invention relates to a storage device, and more specifically to information protection for a storage device which starts when connected to a computer so as to be able to communicate.

2. Related Art

A storage device with a USB interface for connection to a computer, such as a USB (flash) memory or a portable HDD with a USB connection, is small and portable. Thus, there is a greater possibility that it will be lost or stolen. Various policies have been adopted to prevent disclosure of information in a USB memory when lost or stolen or when the user leaves a computer with the USB memory still connected.

For example, a password is entered when information is written to a storage device such as USB memory, and information cannot be read from the storage device unless the password is entered.

An information storage device is disclosed in Japanese Patent Publication No. 2009-042927 (Patent Literature 1) which has a reader/writer (R/W) for receiving ID from a RFID card and large capacity storage, and which changes the accessible areas from a terminal with large capacity storage and blocks access to the R/W from the terminal on the basis of an ID received from an RFID card.

A storage device is disclosed in Japanese Patent Publication No. 2005-267533 (Patent Literature 2) which prohibits access to some or all data recorded on the storage device or encrypts data recorded on the storage device when it has been detected that the storage device has been moved more than a predetermined distance from an information processing device to an isolated state

SUMMARY OF THE INVENTION

One aspect of the invention includes a storage device started when connected to a computer so as to be able to communicate. The storage device includes: an interface for controlling communication with the computer, a data storage unit for storing data received from the computer via the interface, a radio signal processing unit for receiving radio signals including ID information at a predetermined timing and for authenticating the received ID information, and a control unit for encrypting data using the authenticated ID information as a key, for sending the encrypted data to a data storage unit, and for disabling communication with the computer via the interface when radio signals including the authenticated ID information are not received by the radio signal processing unit within a predetermined period of time.

BRIEF DESCRIPTION OF THE DRAWINGS

FIG. 4 (*b*) is a diagram showing an embodiment of the flow of the polling process performed by the radio signal processing unit of the present invention.

DETAILED DESCRIPTION OF THE PREFERRED EMBODIMENTS

Figure 1:
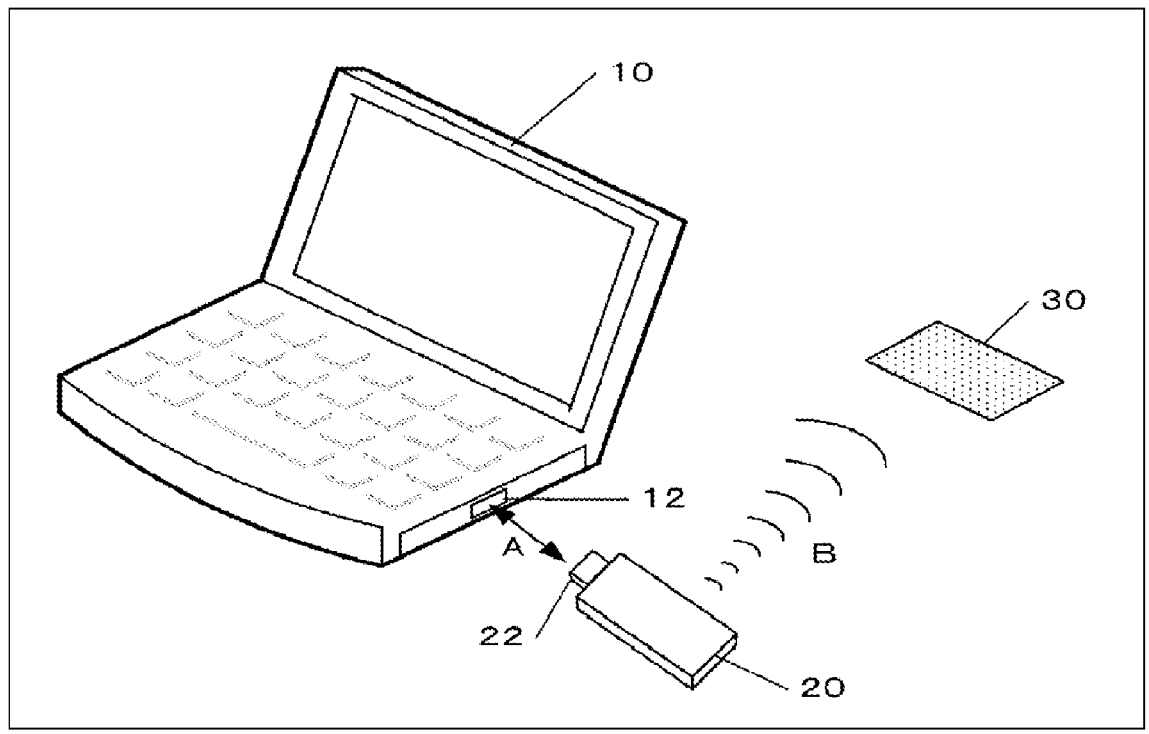
FIG. 1 is a diagram showing an example of a configuration for the storage device of an embodiment of the present invention and its communication environment.

In the passport-input method, driver and application software has to be introduced to the computer beforehand to protect information. Also, the password has to be entered each time information is read or written, and periodic maintenance is required such as password updates.

The storage device in Patent Literature 1 does not take into account the protection of data when an ID cannot be received from an RFID card. It also does not take into account the encryption of data.

The storage device in Patent Literature 2 does not take into account the protection of data when the storage device has not been moved more than a predetermined distance from an information processing device to an isolated state. It also does not take into account the encryption of data unless the storage device is in an isolated state.

Therefore, a purpose of the present invention is to solve or reduce these technical problems by providing proper and effective information protection in a storage device which starts when connected to a computer so as to be able to communicate.

An aspect of the present invention provides a storage device started when connected to a computer so as to be able to communicate. This storage device includes: an interface for controlling communication with the computer; a data storage unit for storing data received from the computer via the interface; a radio signal processing unit for receiving radio signals including ID information at a predetermined timing and for authenticating the received ID information; and a control unit for encrypting data using the authenticated ID information as a key, for sending the encrypted data to a data storage unit, and for disabling communication with the computer via the interface when radio signals including the authenticated ID information are not received by the radio signal processing unit within a predetermined period of time.

Because the present invention can authenticate received ID information and encrypts data using authenticated ID information as a key, the inconvenience of having to enter a password during data encryption can be eliminated. Because the present invention can disable communication with a computer when radio signals including authentication ID information are not received within a predetermined period of time, data inside the storage device can be protected when the storage device is lost or stolen, or when the user leaves a computer while the storage device is being used. The present invention can essentially protect data using the storage device alone without intervention by a computer or software executed by the computer.

In an aspect of the present invention, the control unit reads from the data storage unit encrypted data corresponding to a data read request when a data read request has been received from the computer, decrypts the encrypted data using the authenticated ID information as a key, and sends the decrypted data to the computer via the interface while radio signals including the authenticated ID information are received by the radio signal processing unit within a predetermined period of time.

This aspect of the present invention not only encrypts data, it also decrypts data using authenticated ID information as a key. Thus, the inconvenience of having to enter a password during data decryption can also be eliminated, and data protection can be further enhanced and strengthened.

In an aspect of the present invention, the storage device includes an ID information storage unit for storing the ID information, and an authentication switch for the ID information; and the control unit instructs the radio signal processing unit to store the received ID information in the ID information storage as registered ID information when the authentication switch is turned on.

In this aspect of the present invention, the user can choose to protect the ID information storage unit using new ID information as newly registered ID information. This allows the storage device to be reused as a storage device that functions only when the newly registered ID information is used. This also allows the storage device to be reused (and repeatedly used) while maintaining the data protection function.

In an aspect of the present invention, the radio signal processing unit performs authentication by determining whether or not the received ID information matches the registered ID information stored in the ID information storage unit except when the authentication switch is turned on.

In this aspect of the present invention, authentication of received ID information in the storage device is performed automatically through comparison to the registered ID information. As a result, encryption keys and authentication using encryption keys can be managed without the intervention of a computer.

In an aspect of the present invention, the ID information includes a first ID number unique to the medium carrying the ID information and a second ID number accompanying the first ID number, and the control unit uses the first ID number and/or the second ID number in the authenticated ID information as a key.

In this aspect of the present invention, the first ID number unique to the medium carrying the ID information and/or the second ID number accompanying the first ID number is used as the key for decryption. As a result, a medium carrying ID information for communication can be identified (or restricted) by the ID number unique to the medium. This can make data protection even more robust.

In an aspect of the present invention, the radio signal processing unit includes a reader/writer (R/W) for RFID, and wherein the ID information is carried by the medium as an RFID tag able to communicate with the R/W.

In this aspect of the present invention, RFID technology is used to reduce the size of the radio signal processing unit and the medium carrying the ID information, and to reduce power consumption.

The following is an explanation of an embodiment of the present invention with reference to the drawings. FIG. 1 is a diagram showing an example of a configuration for the storage device of the present invention and its communication environment. The communication environment in FIG. 1 consists of a computer 10, USB memory 20, and a non-contact (wireless) ID card 30. The computer 10 is not limited to the notebook computer shown in FIG. 1. It can take any other form such as a desktop computer, tablet or server. The computer 10 can also be connected to a network or stand alone.

The storage device is not limited to the USB memory 20 shown in FIG. 1. Essentially, it can be any storage device which starts when connected to a computer so as to be able to communicate. In other words, it can be a storage device with an interface other than a USB interface. Also, the USB memory 20 does not have to be the semiconductor memory (flash memory) type shown in FIG. 1. It can also be an HDD with a USB connection. In FIG. 1, the USB memory 20 is started by inserting the USB interface (terminal) 22 into the USB interface 12 of the computer 10 in the direction of arrow A. It is then able to communicate with the computer 10. The USB memory 20 communicates wirelessly (B) with the ID card 30.

The ID card 30 includes a circuit (IC, IC tag) for communicating wirelessly with the USB memory 20, an antenna (coil), and memory for storing ID information. The ID card 30 is not limited to the card (flat board) shown in FIG. 1. It can assume any form, such as a disk, pen or name tag. The ID information includes a first ID number unique to the ID card 30 (for example, a product number with several digits) and a second ID number accompanying the first ID number (for example, a sequence of alphanumeric characters). In order to prevent duplication of the ID card 30, the ID information stored in the ID card 30 and the registered ID information for authentication (described below) stored in the storage device should be periodically updated at the same time (changed to other identical ID information).

Figure 2:
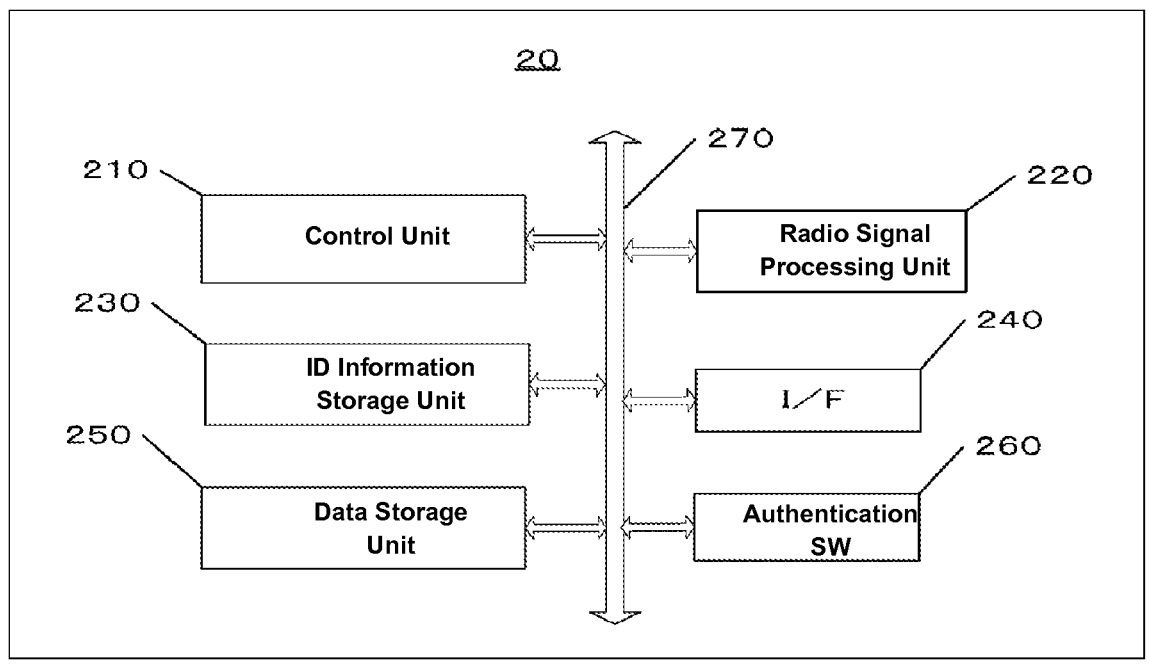
FIG. 2 is a block diagram showing an example of a configuration for an embodiment of the storage device of the present invention.

FIG. 2 is a block diagram showing an example of a configuration for the storage device of an embodiment of the present invention. The example in FIG. 1 is configured for USB memory 20. The element in each block can communicate with the others via the communication path (bus) 270. The control unit 210 includes a processor (CPU), a register and memory, and performs the various types of controls described below. The radio signal processing unit 220 receives radio signals including ID information at a predetermined time interval, and authenticates the received ID information. The ID information storage unit 230 stores ID information. The ID information storage unit 230 can be built into the control unit 210 or can also serve as the memory in the control unit 210.

The interface (I/F) 240 controls communication (input/output) with the computer. The data storage unit 250 manages data received from the computer via the interface (I/F) 240. When the data storage unit 250 is USB memory 20 as described above, it can be flash memory or an HDD. The authentication switch (SW) 260 is a switch turned on by the user when new or updated ID information is stored (registered) in the ID information storage device 230. The authentication switch (SW) 260 is a button or sliding switch which changes position when turned on and off. Either one can be chosen for this embodiment. In order to prevent an ID information update when the user accidentally presses the authentication switch SW 260, the device should be configured so that an ON signal is not outputted unless the authentication switch SW 260 has been held down for more than a predetermined period of time (for example, two or three seconds). When the authentication switch SW 260 is pressed, a small light-emitting element such as an LED can light up or flash to visually notify the user that the registration (update) of new ID information has started and ended. Alternatively, a sound or tone can be generated when the authentication switch SW 260 is pressed to audibly notify the user that the registration (update) of new ID information has started and ended.

Figure 3:
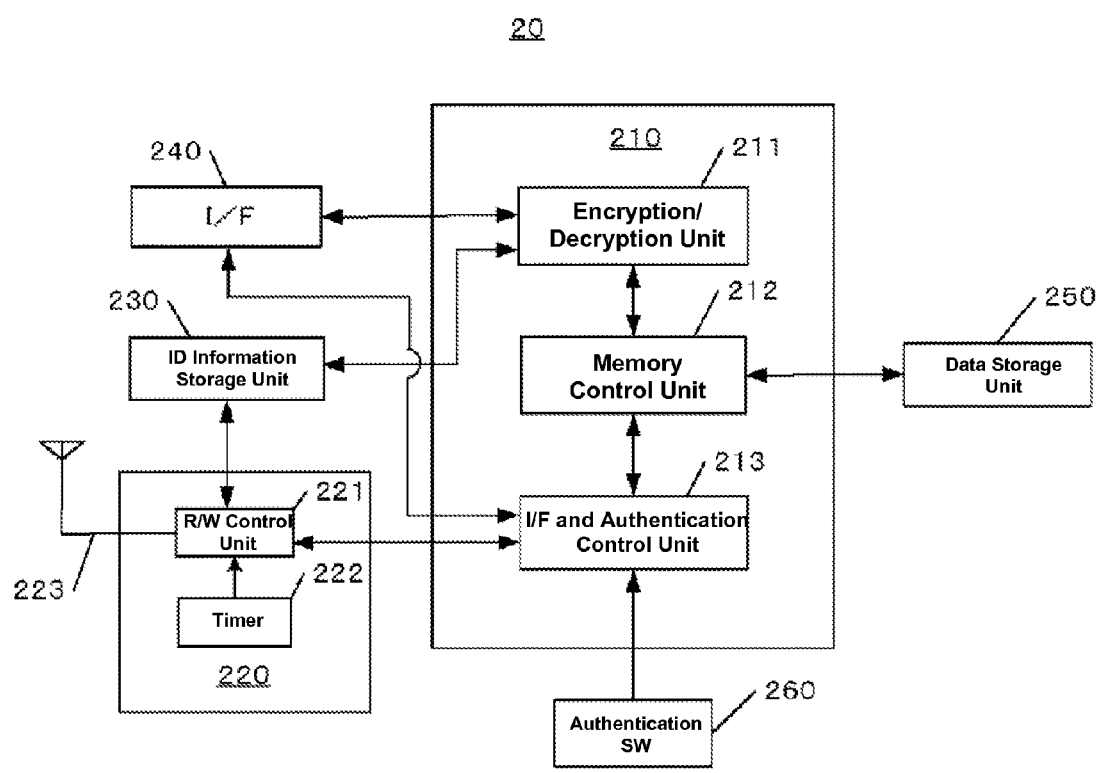
FIG. 3 is a diagram showing an example of a configuration for an embodiment of the storage device of the present invention and an example of signal paths.

FIG. 3 is a diagram showing an example of a configuration for the storage device of an embodiment of the present invention and an example of signal paths. The following is an explanation with reference to FIG. 3 of the operations performed by the main elements constituting the present invention. The radio signal processing unit 220 includes an R/W control unit 221, a timer 222, and an antenna 223. The R/W control unit 221 is a reader/writer (R/W) for RFID. In RFID R/W, an ID card with a built-in IC (ID) tag for RFID is used. In RFID R/W, electromagnetic waves or radio signals are sent to the ID card via the antenna 223 (polling), the ID card with a built-in IC tag for RFID is activated, and ID information stored in the memory of the ID card is transmitted as radio signals (electromagnetic waves). The R/W control unit 221 receives the radio signals including the ID information from the ID card. The timer 222 measures the time from the start of polling. The time measured by the timer 222 is used to authenticate the ID information and to protect data as described below. The R/W control unit 221 authenticates the received ID information, and stores the authenticated ID information in the ID information storage unit 230. Control of the polling and ID information authentication is further described below.

The control unit 210 includes an encryption/decryption unit 211, a memory control unit 212, and an I/F and authentication control unit 213. The encryption/decryption unit 211 encrypts data sent from the computer via the I/F 240 using the authenticated ID information as a key, and sends the encrypted data to the data storage unit 250 via the memory control unit 212. During encryption, the encryption/decryption unit 211 uses the first ID number unique to the ID card 30 (for example, a product number with several digits) and/or the second ID number accompanying the first ID number (for example, a sequence of alphanumeric characters) mentioned above as the encryption or decryption key.

The memory control unit 212 includes functions common to so-called memory controllers such as write control for data to the data storage unit 250, read control for data from the data storage unit 250, and read/write address control for the data storage unit 250.

When signals have been received from the R/W control unit 221 indicating that radio signals have been received including ID information authenticated within a predetermined period of time, and a data read request has been received from the computer via the I/F 240, the I/F and authentication control unit 213 instructs the memory control unit 212 to read the data corresponding to the read request. This predetermined period of time can be, for example, ten seconds. The R/W control unit 221 determines whether or not the predetermined period of time has been reached based on the amount of time that has elapsed since the start of polling as measured by the timer 222. The memory control unit 212 reads the encrypted data corresponding to the read request from the data storage unit, and sends the encrypted data to the encryption/decryption unit 211. The encryption/decryption unit 211 decrypts the sent encrypted data using the authenticated ID information as a key, and sends the decrypted data to the computer via the I/F 240.

When signals have not been received from the R/W control unit 221 indicating that radio signals have been received including ID information authenticated within a predetermined period of time, and a data read request has been received from the computer via the I/F 240, the I/F and authentication control unit 213 disables communication with the computer using the I/F 240. This predetermined period of time can be, for example, ten seconds. Communication with the computer can be disabled, for example, by setting the impedance of the data line for the I/F 240 to high (Hi-Z) or low (Low-Z) to logically establish a state cut off from the computer (data send-receive disabled state). At this time, transactions in progress are executed until the end, and the transmission or reception of at least one packet has been completed. However, because data being transferred is not transferred in a complete form, it has to be re-transmitted after communication has been re-established with the computer. To re-establish communication with the computer, the storage device 20 has to be restarted. In the case of the USB memory 20 shown in FIG. 1, it has to be removed from the USB interface (terminal) 22 of the computer 10 and re-inserted.

The I/F and authentication control unit 213 also receives signals that the authentication switch (SW) 260 for ID information has been turned on, and instructs the R/W control unit 221 to store the received ID information in the ID information storage unit 230 as registered ID information. The newly stored registered ID information is referenced in the authentication process performed by the R/W control unit 221. In other words, it performs authentication by determining whether or not there is a match with the registered ID information. This information is also used as an encryption/decryption key by the encryption/decryption unit 211. Thus, use of the storage device 20 can be continued using ID information stored in a new ID card when an ID card has been lost or stolen. Because the ID information is different, data encrypted using the previous (old) ID information cannot be accessed. This prevents information (data) from being divulged. When new ID information is registered, the old data can be deleted by reformatting the data storage unit 250. This completely prevents the divulging of old data.

Figure 4:
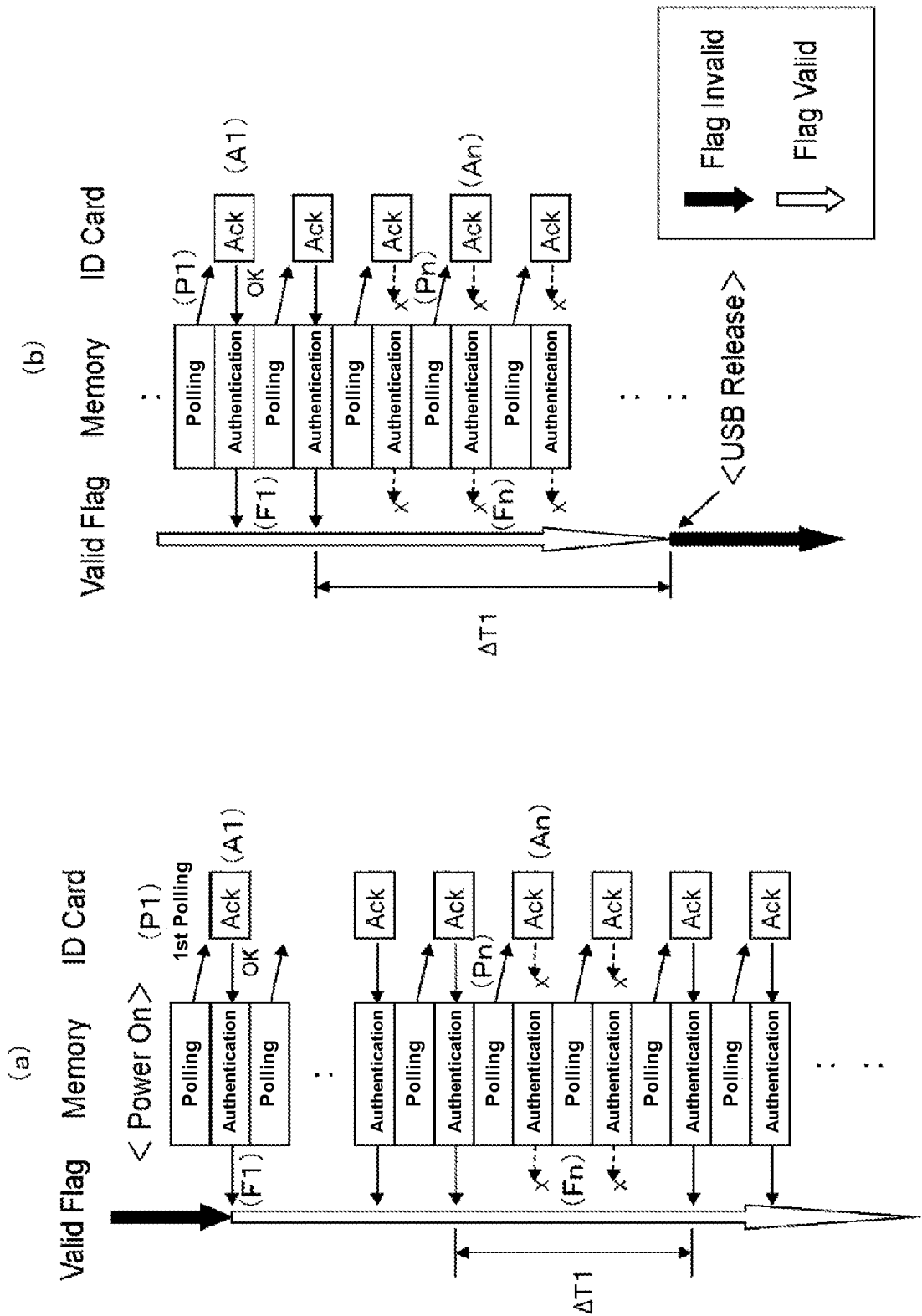
FIG. 4 (*a*) is a diagram showing an embodiment of the flow of the polling process performed by the radio signal processing unit of the present invention.

The following is an explanation with reference to FIG. 4 of the polling and ID information authentication controls performed by the storage device. FIG. 4 is a diagram showing the polling and authentication processing flow between the storage device (memory) and ID card (ID card). As mentioned above, the polling and authentication control in FIG. 4 is actually executed by the radio signal processing unit 220 (R/W control unit 221) inside the storage device. In FIG. 4 (a), authentication of the ID information is successful. In FIG. 4 (b), authentication fails.

In FIG. 4 (a), the storage device is activated (Power On), and polling is started on a predetermined timing. When a ID card is able to communicate with the storage device, it replies with Ack and sends ID information at the same time (A1). The storage device determines whether or not the received ID matches the registered ID information. When it matches and authentication is OK, a Valid Flag is outputted (F1). The same operation is then repeated during each polling operation. During the n-th polling operation (Pn), Ack is not returned and ID information cannot be received (An). Authentication of ID information by the storage device fails, and an Invalid Flag is outputted (Fn). In FIG. 4 (a), the authentication failure is repeated twice. However, because an authentication failure occurred within predetermined time period ΔT1, output of the Valid Flag is maintained, and authentication of ID information continues. This predetermined time period ΔT1, as mentioned above, can be ten seconds. When output of the Valid flag is continued beyond the predetermined time period, as mentioned above, signals indicating this state, that is, signals indicating that radio signals including authenticated ID information were received within the predetermined time period, are sent from the R/W control unit 221 to the I/F and authentication control unit 213.

In FIG. 4 (b), as in FIG. 4 (a), polling is performed on a predetermined timing, and authentication is performed (P1, A1, F1). During the n-th polling operation (Pn), Ack is not returned and ID information cannot be received (An). Authentication of ID information by the storage device fails, and an Invalid Flag is outputted (Fn). In FIG. 4 (b), unlike in FIG. 4 (*a*), authentication failure continued to occur thereafter. The predetermined time period ΔT1 is exceeded and an Invalid Flag indicating authentication failure is outputted. In this situation, signals indicating this state, that is, signals indicating that radio signals including authenticated ID information were not received within the predetermined time period, are sent from the R/W control unit 221 to the I/F and authentication control unit 213. As a result, and as mentioned above, communication with the computer via the I/F 240 is disabled (USB release). This prevents access to the information (data) stored in the storage device, and prevents information from being divulged.

The predetermined time period mentioned above for determining the success or failure of authentication is set, for example, at ten seconds for the following reasons: (a) this is enough time for the processing of a transaction to be ended; (b) there are situations in which ID information cannot be received after two or three tries because of radio conditions; (c) the transfer of a file with several dozen MB can be completed without more transfer interruptions than are necessary; and (d) it is difficult for a third party to copy a file (data) from the storage device within ten seconds with the ID card away from the storage device.

Embodiments of the present invention were explained with reference to the drawings. However, the present invention is not limited to these embodiments. The present invention can be embodied by those skilled in the art so as to include various improvements, modifications and changes that do depart from the spirit or scope of the present invention.

What is claimed is:

1. A storage device started when connected to a computer so as to be able to communicate, the storage device comprising:
    an interface for controlling communication with the computer;
    a data storage unit for storing data received from the computer via the interface;
    a radio signal processing unit having a timer unit and an antenna, the antenna of the radio signal processing unit receiving radio signals including ID information from a wireless ID card at a predetermined timing and for authenticating the received ID information;
    a control unit for encrypting data using the authenticated ID information as a key, for sending the encrypted data to a data storage unit, and for disabling communication with the computer via the interface when radio signals including the authenticated ID information are not received from the wireless ID card by the radio signal processing unit within a predetermined period of time determined by the timer unit, the radio signal processing unit polling the wireless ID card on a repeated basis during the predetermined period of time for receiving the authenticated ID information from the wireless ID card; and
    an ID information storage unit for storing the ID information; and an authentication switch for the ID information; wherein the control unit instructs the radio signal processing unit to store the received ID information in the ID information storage as registered ID information when the authentication switch is turned on, wherein the radio signal processing unit, whenever the authentication switch is turned off, performs authentication by determining whether or not the received ID information matches the registered ID information stored in the ID information storage unit.

2. The storage device of claim 1, wherein the control unit reads from the data storage unit encrypted data corresponding to a data read request when a data read request has been received from the computer, decrypts the encrypted data using the authenticated ID information as a key, and sends the decrypted data to the computer via the interface while radio signals including the authenticated ID information are received by the radio signal processing unit within a predetermined period of time.

3. The storage device of claim 1, wherein the ID information includes i) a first ID number unique to the medium carrying the ID information and ii) a second ID number accompanying the first ID number, and wherein the control unit uses one of I) the first ID number and ii) the second ID number in the authenticated ID information as a key.

4. The storage device of claim 3, wherein the radio signal processing unit includes a R/W unit for RFID, and wherein the ID information is carried by the medium as an RFID tag able to communicate with the R/W unit.

5. The storage device of claim 1, wherein the interface is a USB interface, and wherein the data storage unit includes at least one of a semiconductor memory and a magnetic memory.

6. A removeably attachable portable storage device started when connected to a computer so as to be able to communicate with the computer, the removeably attachable portable storage device comprising:
    an interface for controlling communication with the computer;
    a first control unit for enabling and disabling communication with the computer via the interface;
    a data storage unit for storing data received from the computer via the interface based on the first control unit enabling communication with the computer via the interface;
    a radio signal processing unit having a timer unit and a second control unit in communication with the first control unit, the second control unit coupled to an antenna for receiving radio signals including ID information from a wireless ID card for authenticating the received ID information within a predetermined time period measured by the timer unit from a start of polling of the wireless ID card on a repeated basis by the second control unit, wherein based on the second control unit authenticating the received ID information within the predetermined time period, the first control unit enables communication between the computer and data storage unit via the interface;
    a memory control unit in communication with the interface and the first control unit for accessing data, wherein the memory control unit, instructed by the first control unit, receives encrypted data that is encrypted using the received ID information for storage by the data storage unit and accesses encrypted data from the data storage unit for decryption using the received ID information; and
    an ID information storage unit for storing the ID information; and an authentication switch for the ID information; wherein the second control unit instructs the radio signal processing unit to store the received ID information in the ID information storage as registered ID information when the authentication switch is turned on, wherein the radio signal processing unit, whenever the authentication switch is turned off, performs authentication by determining whether or not the received ID information matches the registered ID information stored in the ID information storage unit.

7. The storage device of claim 6, wherein the predetermined time period is set based on a required time for processing of a transaction.

8. The storage device of claim 6, wherein the predetermined time period is set based on radio conditions that account for multiple failures associated with receiving the ID information by the second control unit from the wireless ID card.

* * * * *